(12) United States Patent
Sakamaki et al.

(10) Patent No.: US 9,516,042 B2
(45) Date of Patent: Dec. 6, 2016

(54) APPARATUS FOR SWITCHING BETWEEN MULTIPLE SERVERS IN A WEB-BASED SYSTEM

(71) Applicant: Canon Denshi Kabushiki Kaisha, Chichibu-shi, Saitama-ken (JP)

(72) Inventors: Hisashi Sakamaki, Yokohama (JP); Kiyoyuki Hattori, Tokyo (JP); Yoshifumi Okamoto, Yokohama (JP); Takashi Yotsuyanagi, Kawasaki (JP); Sumihiko Arima, Tokyo (JP)

(73) Assignee: CANON DENSHI KABUSHIKI KAISHA, Chichibu-Shi, Saitama-Ken (JP)

( * ) Notice: Subject to any disclaimer, the term of this patent is extended or adjusted under 35 U.S.C. 154(b) by 0 days.

(21) Appl. No.: 14/518,610

(22) Filed: Oct. 20, 2014

(65) Prior Publication Data
US 2015/0113647 A1    Apr. 23, 2015

(30) Foreign Application Priority Data

Oct. 22, 2013  (JP) .................................. 2013-219493
Sep. 30, 2014  (JP) .................................. 2014-202107

(51) Int. Cl.
| | |
|---|---|
| G06F 21/56 | (2013.01) |
| H04L 29/06 | (2006.01) |
| H04L 29/08 | (2006.01) |
| H04L 29/14 | (2006.01) |
| H04L 12/24 | (2006.01) |

(52) U.S. Cl.
CPC ......... *H04L 63/1408* (2013.01); *H04L 63/145* (2013.01); *H04L 67/1002* (2013.01); *H04L 69/40* (2013.01)

(58) Field of Classification Search
CPC ............ H04L 63/1408; H04L 63/1441; H04L 63/1466; H04L 63/1483; H04L 67/22; G06F 17/30289; G06F 21/566; G06F 2221/2119; G06F 17/30893

See application file for complete search history.

(56) References Cited

U.S. PATENT DOCUMENTS

| | | | |
|---|---|---|---|
| 8,635,701 | B2 | 1/2014 | Hilaiel et al. .................. 726/25 |
| 2007/0282895 | A1 | 12/2007 | Sakamaki et al. ......... 707/103 R |
| 2012/0210017 | A1 | 8/2012 | Muhunthan et al. ......... 709/238 |
| 2013/0074181 | A1 | 3/2013 | Singh ............................. 726/22 |

FOREIGN PATENT DOCUMENTS

| | | | |
|---|---|---|---|
| EP | 2251783 A1 * | 11/2010 | ........... G06F 9/5088 |
| JP | 2003-296211 A | 10/2003 | |
| JP | 2013-140634 A | 7/2013 | |

OTHER PUBLICATIONS

Globule: A Platform for Self-Replicating Documents. Pierre et al. PROMS(2001).*

* cited by examiner

*Primary Examiner* — Venkat Perungavoor
(74) *Attorney, Agent, or Firm* — Fitzpatrick, Cella, Harper & Scinto

(57) ABSTRACT

A main server and a mirror server hold the same content. A server switching apparatus sets only one of the web servers to be active. In the case where the mirror server has not been attacked in an immediately-previous operating period, the server switching apparatus switches from the main server to the mirror server. Upon receiving a request from a client computer, the server switching apparatus transfers the request to the active web server. The active web server then sends the requested content.

15 Claims, 12 Drawing Sheets

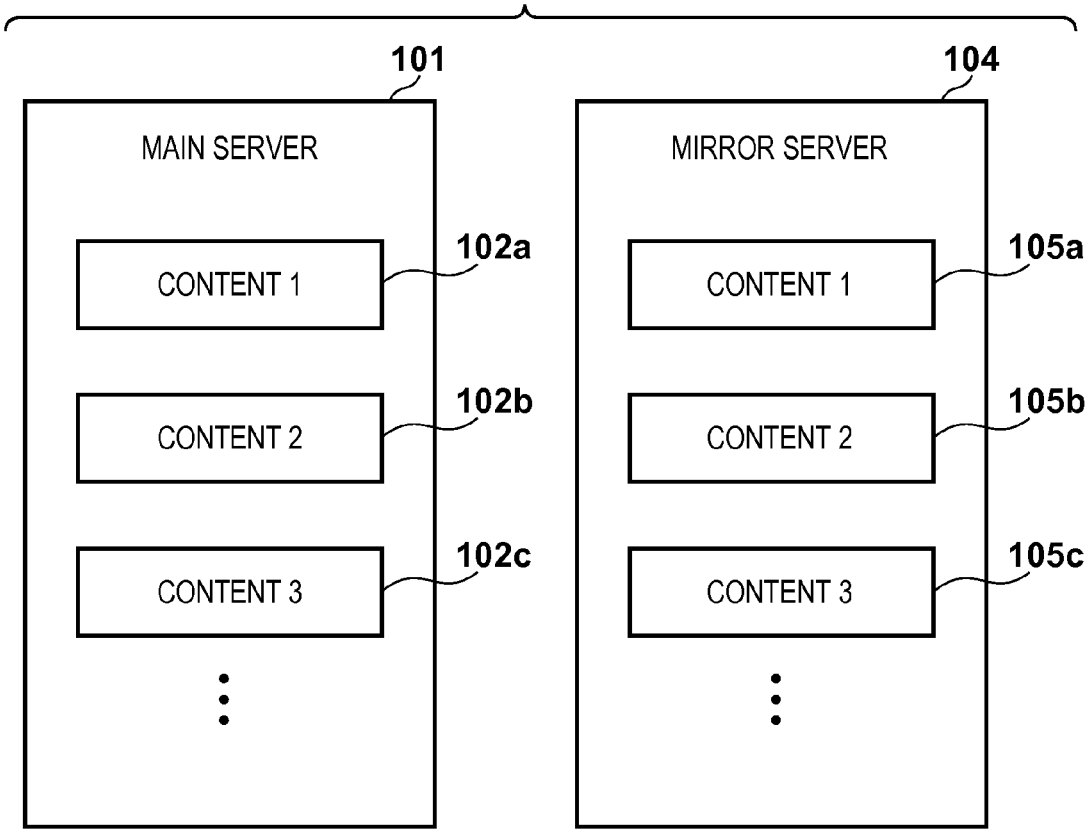
F I G. 9

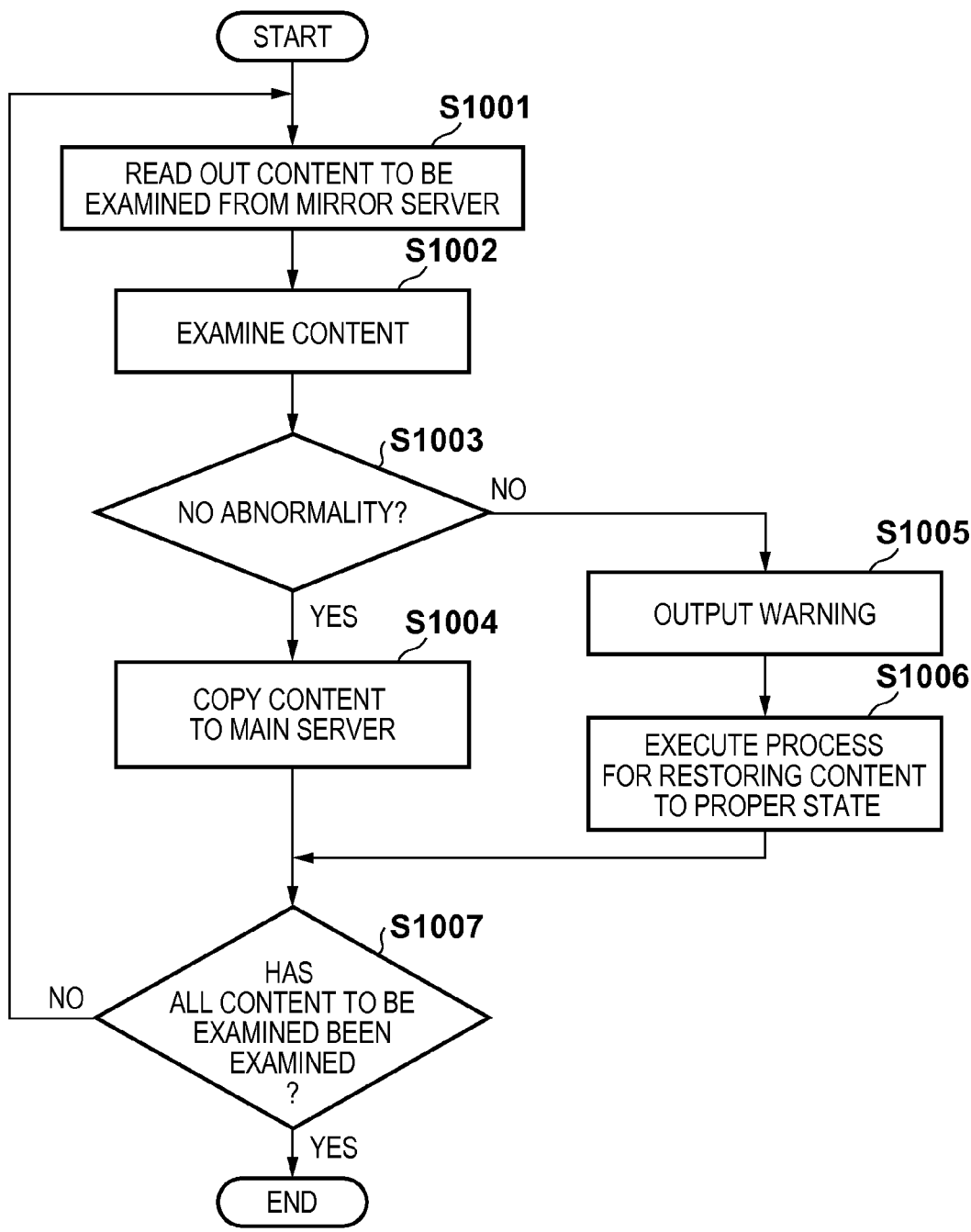
F I G. 10

FIG. 11A

| DESTINATION ADDRESS | AAAAA@xxxxxxx.co.jp ▽ |
| COLOR SELECTION | COLOR | BLACK AND WHITE |
| RESOLUTION | 300dpi x 300dpi ▽ |
| DOUBLE-SIDED DOCUMENT | DOUBLE-SIDED | SINGLE-SIDED |

FIG. 11B

THE FIXER WILL SOON NEED TO BE REPLACED.

TONER IS RUNNING LOW.

1

APPARATUS FOR SWITCHING BETWEEN MULTIPLE SERVERS IN A WEB-BASED SYSTEM

BACKGROUND OF THE INVENTION

1. Field of the Invention

The present invention relates to web systems, server switching apparatuses, server switching methods, and programs.

2. Description of the Related Art

Attacks on websites by hackers (uploading viruses, tampering with websites, and so on) have become problematic in recent years, and a variety of techniques for protecting websites from such attacks are being developed. Japanese Patent Laid-Open No. 2013-140634 discloses a technique that restricts operations by computer program code within a web browser, and executes the restricted operations only in the case where consent has been given. Japanese Patent Laid-Open No. 2003-296211, meanwhile, discloses a technique for automatically switching from a master server to a mirror server.

However, Japanese Patent Laid-Open No. 2013-140634 is a technique applied on the client side, and thus cannot prevent a web server itself from being infected with viruses, being tampered with, and so on. Meanwhile, Japanese Patent Laid-Open No. 2003-296211 does not mention avoiding attacks on the mirror server. As such, if a master server is switched to a mirror server that has been attacked in the past, the virus will spread through the mirror server.

SUMMARY OF THE INVENTION

Accordingly, the present invention protects servers, content, and so on with more certainty than in the past.

The present invention provides a web system comprising the following elements. A first web server is configured to hold content. A second web server is configured to hold the same content as the content held in the first web server. A server switching apparatus is configured to a web server providing the content to a user when a predetermined server switching condition is met. The server switching apparatus may include the following elements. An attack detection unit is configured to detect whether or not the web server, of the first web server and the second web server, that is not active in order to provide the content to the user, has been attacked in the past. A switching unit is configured to switch from the web server that is active to the web server that is not active in the case where a condition that the web server that is not active has not been attacked in the past, serving as one server switching condition, is met. A transfer unit is configured to, when a request is received from the user, transfer the request to the web server, of the first web server and the second web server, that has been activated by the switching unit. The web server is further configured to, of the first web server and the second web server, that has been activated by the switching unit, send content requested by the request to the user.

Further features of the present invention will become apparent from the following description of exemplary embodiments (with reference to the attached drawings).

BRIEF DESCRIPTION OF THE DRAWINGS

FIG. 9 is a block diagram illustrating an example of the functional configuration of the system according to another embodiment.

FIG. 10 is a flowchart illustrating an example of the functional configuration of the system according to another embodiment.

FIG. 11A is a diagram illustrating an example of a display screen in the system according to another embodiment.

FIG. 11B is a diagram illustrating an example of a display screen in the system according to another embodiment.

DESCRIPTION OF THE EMBODIMENTS

Hereinafter, embodiments of the present invention will be described with reference to the appended drawings. Note that the constituent elements denoted in the following embodiments are only examples, and the scope of the present invention is not intended to be limited thereto. Furthermore, all combinations of the features described in the following embodiments are not necessarily required as units for achieving the present invention.

Figure 1:
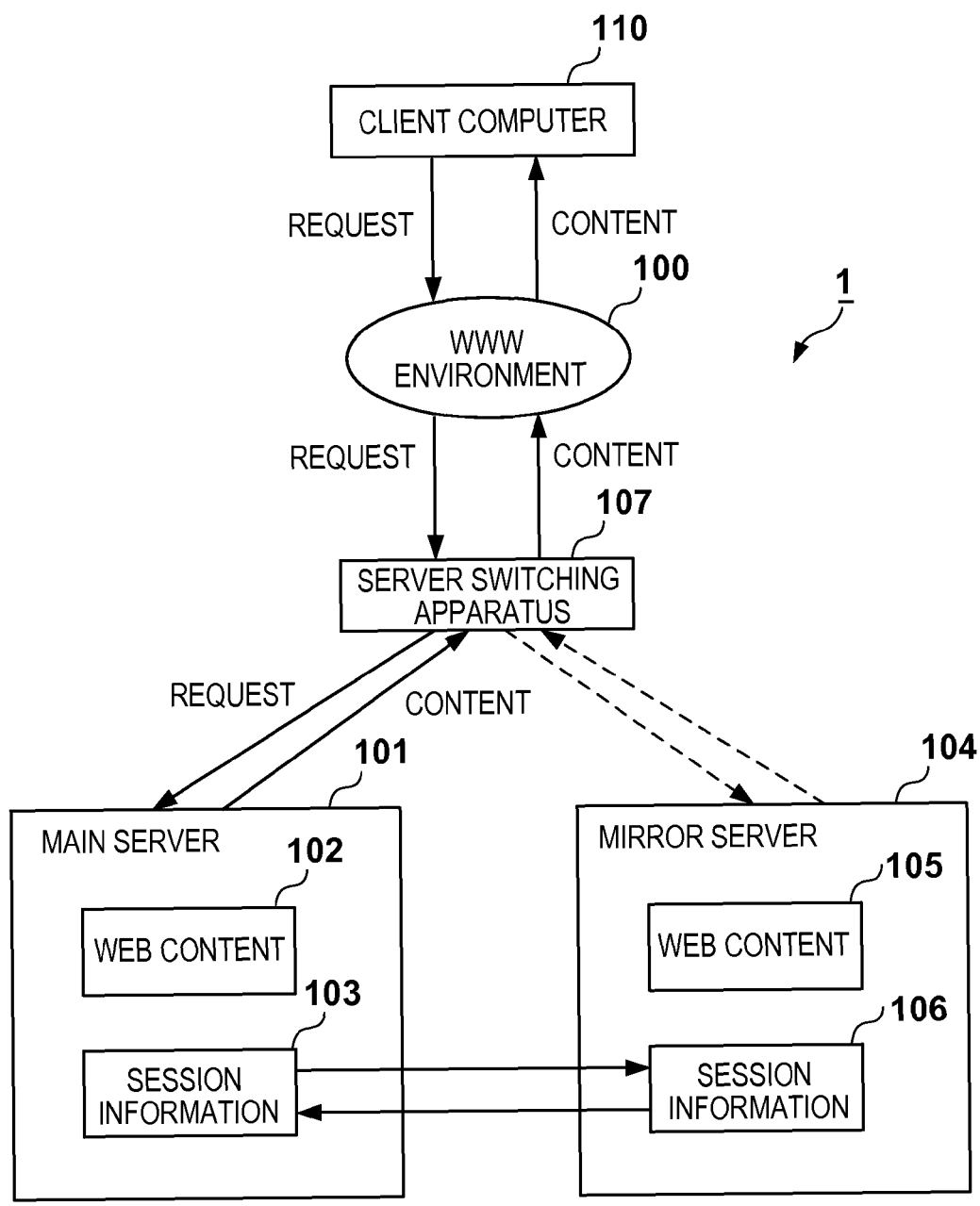
FIG. 1 is a block diagram illustrating an example of the functional configuration of a system according to an embodiment.

A system according to the present embodiment will be described using FIG. 1. As shown in FIG. 1, in a web system 1 according to the present embodiment, a main server 101 or a mirror server 104 is connected to a WWW environment 100, which is a network such as the Internet or an intranet, via a server switching apparatus 107. Note that there may be three or more web servers.

The main server 101 stores web content 102 that is sent to a client computer 110 when a request is received from the client computer 110, and session information 103 in which is recorded information regarding the client computer 110 accessing the web content 102. In the same manner, the mirror server 104 stores web content 105 that is sent to the client computer 110 when a request is received from the client computer 110, and session information 106 in which is recorded information regarding the client computer 110 accessing the web content 105. The web content 102 and the web content 105 are perfectly identical web content (HTML files, image files, audio files, video files, scripts, and so on). The session information 106 is created by copying the session information 103 during a period in which the main server 101 is providing a web service to the WWW environment 100 (an active period). This copying may be executed when switching web servers. Normally, the web content 102 and the web content 105 are uploaded by a user that has administrator privileges. The session information 103 and 106 may also include the IP address, a session ID, and details of operations that have been executed (downloaded content, names of files that have been uploaded, and so on) of the client computer 110 that has accessed the server. In other words, the session information 103 and 106 contains information that enables a user or a client computer to be identified, details of operations executed by the client computer 110 with respect to the server, and so on. As such, when an attack on the content, such as a virus infection, tampering, or the like, has been detected, the stated information is useful in identifying the user or computer that carried out the attack. Note that some of the session information may be recorded in an access log.

Figure 2:
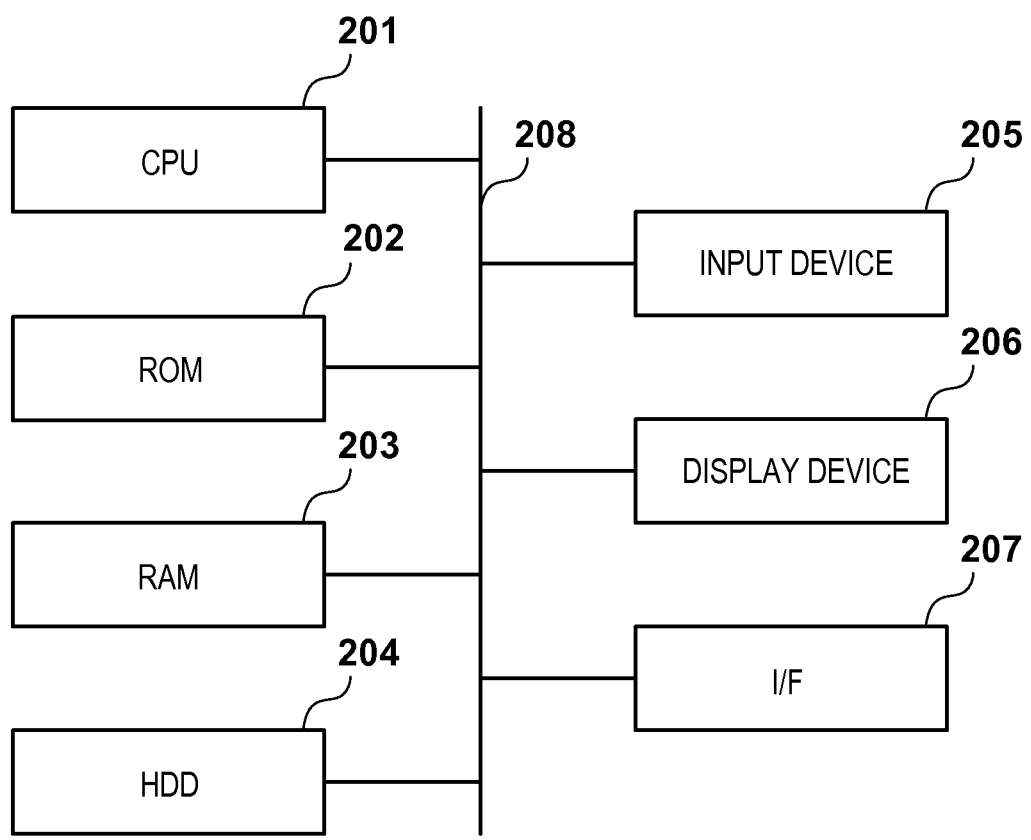
FIG. 2 is a block diagram illustrating an example of a hardware configuration according to an embodiment.

FIG. 2 is a block diagram illustrating an example of the hardware configuration of a computer that can be employed as the main server 101, the mirror server 104, or the server switching apparatus 107. A CPU 201 controls the computer as a whole using computer programs, data, and so on stored in a ROM 202, a RAM 203, and so on. In the case where this computer is employed as the main server 101, the mirror server 104, or the server switching apparatus 107, the CPU 201 executes the respective processes described below as the main server 101, the mirror server 104, or the server switching apparatus 107. Configuration data, a boot program, and so on for the computer are stored in the ROM 202. The RAM 203 includes an area for temporarily storing computer programs, data, and so on loaded from an HDD (hard disk drive) 204, data received from the exterior via an interface 207, and so on. The RAM 203 further includes a working area used by the CPU 201 when executing various processes. In other words, the RAM 203 can provide various types of storage areas as appropriate. An OS (operating system), computer programs and data for causing the CPU 201 to execute various types of processes for the apparatus the computer is employed as, and so on are stored in the HDD 204. In the case where this computer is employed as the main server 101, the mirror server 104, or the server switching apparatus 107, the stated computer programs include computer programs for causing the CPU 201 to execute the respective processes described below as the main server 101, the mirror server 104, or the server switching apparatus 107. The computer programs, data, and so on stored in HDD 204 are loaded into the RAM 203 as appropriate under the control of the CPU 201, and are then processed by the CPU 201. An input device 205 is configured of a keyboard, a mouse, and the like, and by operating the input device 205, an operator of the computer can input various types of instructions to the CPU 201. A display device 206 is configured of a CRT display, a liquid-crystal display, or the like, and displays the results of processing performed by the CPU 201 as images, text, and so on. The interface 207 is configured of various types of interfaces. These include a network interface for connecting the computer to a network and a device interface for connecting the computer to a storage device, for example. 208 indicates a bus that connects the aforementioned elements to each other.

To simplify the descriptions, the present embodiment describes the main server 101, the mirror server 104, the server switching apparatus 107, and the client computer 110 all as being computers having the configuration illustrated in FIG. 2; however, the computer configurations are not limited to the stated configuration. Likewise, computers having mutually different configurations may be employed as the main server 101, the mirror server 104, and the server switching apparatus 107, respectively.

The web content 102 that is to be provided to the client computer 110 is placed in the main server 101, and is made available in the WWW environment 100 by the main server 101, via the server switching apparatus 107. The session information 103, which is generated when a user browses the web content 102, is saved in the main server 101. The session information 103 saved in the main server 101 can be used by the web content 102.

The web content 105 that is to be provided to the client computer 110 is placed in the mirror server 104, and is made available in the WWW environment 100 by the mirror server 104, via the server switching apparatus 107. At this time, the web content 105 placed in the mirror server 104 is exactly the same as the web content 102 placed in the main server 101.

The session information 106, which is generated when the user (the client computer 110) browses the web content 105 in the mirror server 104, is saved in the mirror server 104. The session information 106 saved in the mirror server 104 can be used by the web content 105.

The mirror server 104 is not connected to the WWW environment 100 while the main server 101 is connected to the WWW environment 100 and the web content 102 is available. Conversely, the main server 101 is not connected to the WWW environment 100 while the mirror server 104 is connected to the WWW environment 100 and the web content 105 is available. A state in which the content can be provided to the client computer 110 will be referred to as "active" (a "connected state"/an "available state"), whereas a state in which the content cannot be provided to the client computer 110 will be referred to as "not active" ("inactive"/a "disconnected state"/an "unavailable state").

The server switching apparatus 107 switches between a plurality of web servers that are to be made accessible via the WWW environment 100. This switching is executed when a predetermined switching condition is met. The switching condition is, for example, that a predetermined amount of time has elapsed, a predetermined time has been reached, a virus has been detected on an active web server, the number of clients accessing an active web server has exceeded a threshold, and so on. Two or more switching conditions may be combined as desired as well. For example, although the server switching apparatus 107 normally executes a switch in response to a predetermined amount of time elapsing, the active web server may be switched immediately upon a virus, tampering, or the like being detected in the active web server. This makes it possible to suppress viruses from spreading. The server switching apparatus 107 switches the web server corresponding to a specific URL specified by the user. The term "server switching apparatus 107" refers to a scheme for realizing a server switching function, and the apparatus may be an information device or a program.

When the server switching apparatus 107 switches the server from the main server 101 to the mirror server 104, the session information 103 saved in the main server 101 is copied to the mirror server 104, or the session information 106 saved in the mirror server 104 is overwritten with the session information 103. However, there are cases where the mirror server 104 is connected to the WWW environment 100 and the web content 105 is being provided to (is available in) the WWW environment 100 from the mirror server 104. In other words, when in a state (i) in which the main server 101 is not connected to the WWW environment 100 and the web content 102 is not available in the WWW environment 100, the mirror server 104 may be disconnected from the WWW environment 100 by the server switching apparatus 107 and the web content 105 may be made unavailable, resulting in the state transiting to a state (ii) in which the main server 101 is connected to the WWW environment 100 and the web content 102 is made available in the WWW environment 100. In this case, the session information 106 saved in the mirror server 104 is overwritten by the session information 103 saved in the main server 101.

As a result, the main server 101 and the mirror server 104 can share the session information left through user operations. The user's operation information is thus held over even if the web server the user connects to has been switched. Furthermore, because the URL of the web server is assigned to the IP address of the server switching apparatus 107, the main server 101 and the mirror server 104 both have the same URL as viewed from the WWW environment 100. It thus appears to the user that he or she is operating/browsing the same web content.

Note that the embodiment is not limited to a configuration in which the session information 103 and 106 are saved in the main server 101 and the mirror server 104, respectively; session information common for the main server 101 and the mirror server 104 may be saved in a different device (the server switching apparatus 107, NAS (Network Attached Storage) (not shown), or the like, for example). In this case, even if the connections to the main server 101 and the mirror server 104 are switched, it is not necessary to overwrite the session information saved in the respective servers. Furthermore, a history produced when the user browses the web content 102 and 105 may be saved as an access log. The IP address of the client computer 110 and the like may be included in the log, for example.

Figure 3:
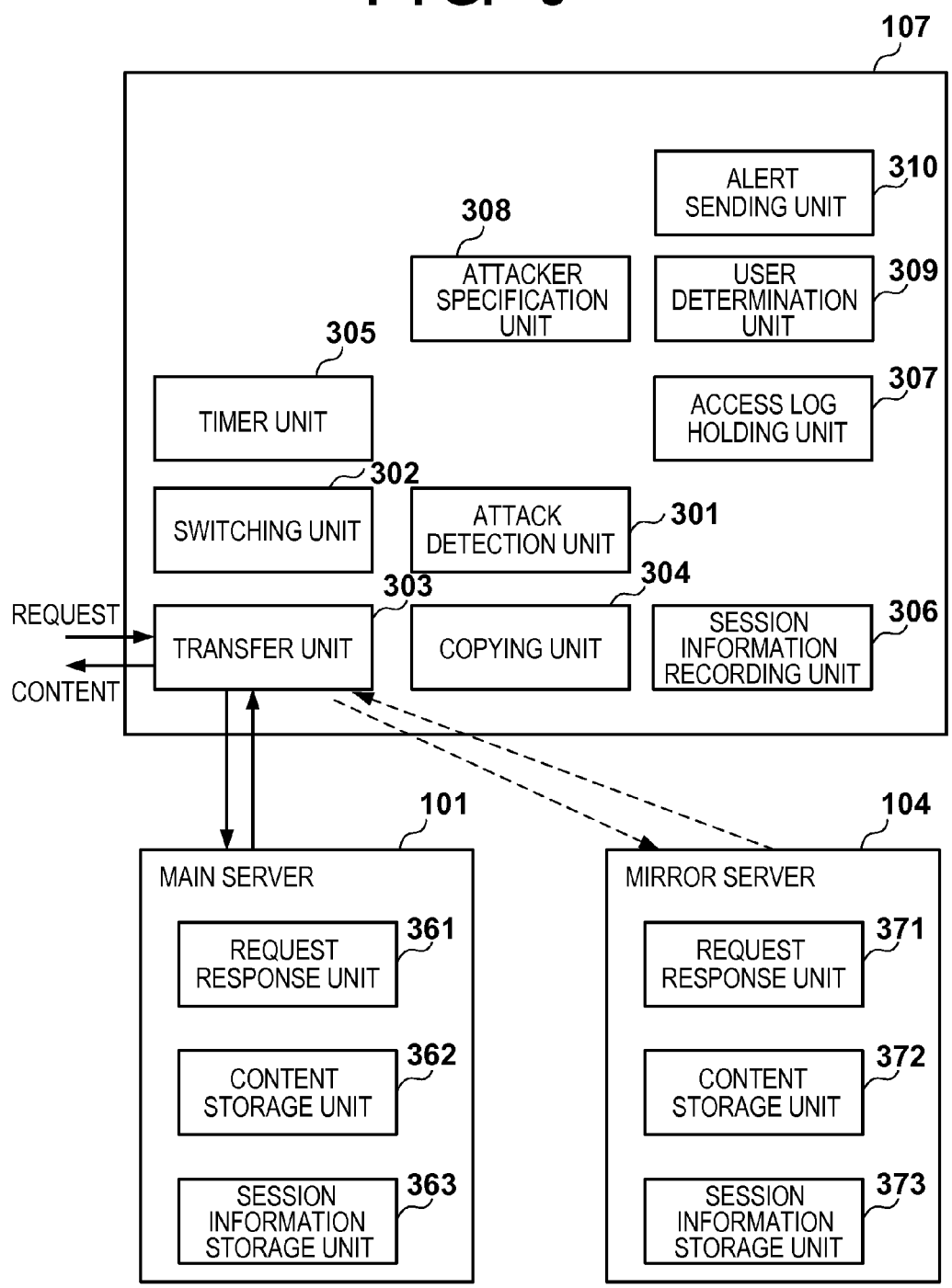
FIG. 3 is a block diagram illustrating an example of the functional configuration of the system according to an embodiment.

FIG. 3 is a diagram illustrating an example of functions realized by the CPU. As described above, the web system 1 includes the main server 101, which stores content; the mirror server 104, which stores the same content as the content stored in the main server 101; and the server switching apparatus 107, which switches the web server providing content to the client computer 110 when a predetermined server switching condition is met.

As shown in FIG. 3, the server switching apparatus 107 has various types of functions. An attack detection unit 301 detects whether or not an attack has been carried out in the past on whichever of the main server 101 and the mirror server 104 that is not currently active, or in other words, is not currently providing content to the client computer 110. As described above, the main server 101 and the mirror server 104 provide a web service in an alternating manner. For example, the main server 101 is active and provides the web service during a first period. The mirror server 104 is not active during the first period. In a second period, which follows the first period, the main server 101 is not active, the mirror server 104 switches to being active, and the mirror server 104 provides the web service. In a third period, which follows the second period, the main server 101 is active, and in a fourth period, which follows the third period, the mirror server 104 is active.

A switching unit 302 switches the web server that is to provide the web service, in accordance with a predetermined server switching condition. One such server switching condition is that the web server that is not active is not being attacked. Users may be exposed to viruses if a web server that has been attacked goes online. Accordingly, if the web server that was not active is a safe web server that has not been attacked, the server is switched from the web server that was active to the web server that was not active.

A transfer unit 303 is present between the plurality of web servers and the client computer 110, and sends/receives information. For example, upon receiving a request to provide content from the client computer 110, the transfer unit 303 transfers the request to whichever of the main server 101 and the mirror server 104 is activated by the switching unit 302. As a result, whichever of the main server 101 and the mirror server 104 that is activated by the switching unit 302 sends the requested content to the client computer 110. Upon receiving content from the active web server, the transfer unit 303 transfers that content to the client computer 110. Although details will be given later, the active web server may transfer the content to the client computer 110 without passing through the server switching apparatus 107.

A copying unit 304 has a function for copying content held in the main server 101 to the mirror server 104. This synchronizes the web content 102 and 105. In other words, the copying unit 304 ensures that the same content is held in the main server 101 and the mirror server 104.

The server switching apparatus 107 may further include a timer unit 305 that measures a set period of time. The switching unit 302 switches from the active web server to the web server that is not active in order to provide content, in the case where the set period of time has been measured by the timer unit 305 and the attack detection unit 301 has not detected an attack. It is necessary to switch web servers every set period of time in order to efficiently detect attacks and maintain the integrity of the web servers. However, detecting tampering, viruses, and so on places a burden on web servers, which may give users the impression that the server has a poor processing speed. Accordingly, detecting whether or not an attack has occurred in detail when the web server is not active makes it easier to accurately detect attacks without burdening the user.

The server switching condition may correspond to a predetermined time being reached, rather than a set period of time elapsing. The switching unit 302 switches from the active web server to the web server that is not active in order to provide content, in the case where the predetermined time has been reached and the attack detection unit 301 has not detected an attack. Through this, a specific web server can be operated between two specific points in time. For example, in the case where there is a gap in performance with respect to the processing speeds of a plurality of web servers, the web server with better processing speed may be activated during periods of concentrated access. This makes it difficult for the user to be affected by such concentrated access.

The server switching apparatus 107, the main server 101, and the mirror server 104 may further include a session information recording unit 306 that records the session information of the client computer 110. The main server 101 and the mirror server 104 share the same session information through the session information recording unit 306, and the content is provided in accordance with the shared session information even if the web server is switched. Because the session information is shared among a plurality of web servers, the user can continue to make use of the web service even if the web server has been switched. Furthermore, because the session information is shared among a plurality of web servers, the user will feel as if he or she is continuing to receive the service from a single web server; in other words, it is less likely that the user will be aware that the web server has switched, which makes it possible to increase the usability.

Although the session information may be held in the session information recording unit 306, the session information may instead be held in the respective web servers. In other words, the main server 101 may include a session information storage unit 363 that stores session information, and the mirror server 104 may include a session information storage unit 373 that stores session information. The session information recording unit 306 monitors and manages the session information, and copies the session information between the session information storage unit 363 and the session information storage unit 373. This ensures that the latest session information is shared.

An access log holding unit 307 may hold access logs for each client computer 110. The access log records details of operations executed by the user (posts to message boards, file downloads and uploads, and so on), times when the operations are executed, login IDs, the IP address of the client computer 110, and so on, for example. In other words, the access log records information that enables attackers, the details of attacks, and so on to be specified. When the attack detection unit 301 detects an attack, an attacker specification unit 308 specifies the client computer 110 that carried out the attack by referring to the access log. Accordingly, the transfer unit 303 can cut off and block access from the client computer 110 that carried out the attack. The access log can also be useful in specifying paths through which viruses spread and propagate.

When the attack detection unit 301 detects an attack on a given web server, a user determination unit 309 may determine, based on the access log, which client computer 110 accessed the web server when the web server was active (in other words, during the active period when the attack occurred). An alert sending unit 310 sends an alert to the client computer 110 that has been determined by the user determination unit 309. This makes it possible to arouse caution on the part of the user. The user can then run a virus scan or the like him/herself, removing the virus and preventing a further spread.

The attack detection unit 301 may have a virus detection function for detecting computer viruses, a tampering detection function for detecting that content has been tampered with, or the like, for example. Such virus detection functions, tampering detection functions, and so on are already well-known, and thus detailed descriptions thereof will be omitted here.

A request response unit 361 of the main server 101 receives and analyzes the request transferred by the transfer unit 303, creates a response, and sends the response. For example, when a request for the web content 102 stored in a content storage unit 362 is made, the request response unit 361 sends the web content 102.

A request response unit 371 of the mirror server 104 receives and analyzes the request transferred by the transfer unit 303, creates a response, and sends the response. For example, when a request for the web content 105 stored in a content storage unit 372 is made, the request response unit 371 sends the web content 105.

Figure 4:
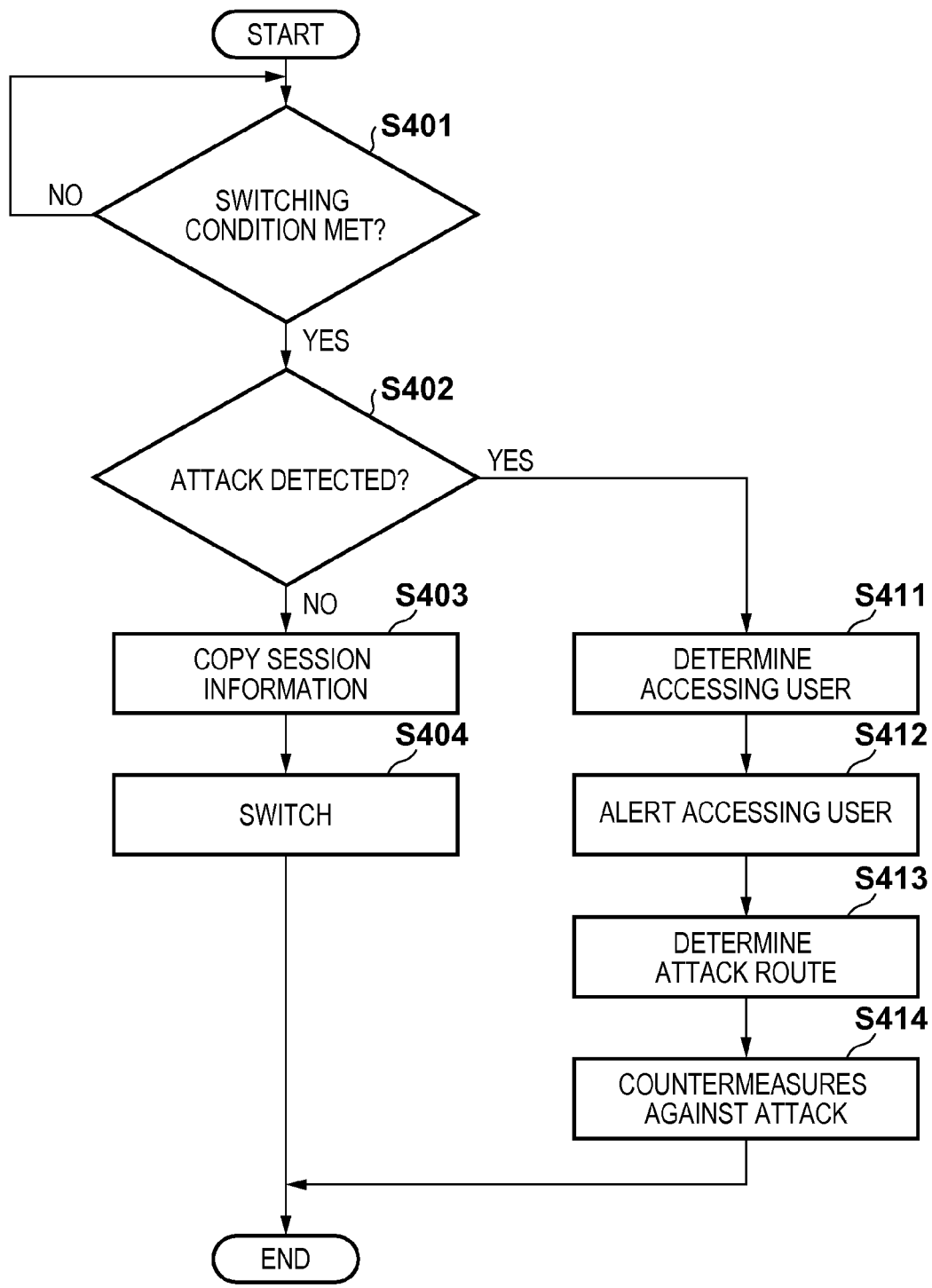
FIG. 4 is a flowchart illustrating an example of the functional configuration of the system according to an embodiment.

FIG. 4 is a flowchart illustrating processing performed by the system according to the present embodiment. Note that units for detecting viruses, analyzing whether or not tampering has occurred, and so on may be implemented by an apparatus not shown here, or may be implemented by the server switching apparatus 107, the main server 101, or the mirror server 104. Here, for the sake of simplicity, it is assumed that the server switching apparatus 107 detects viruses, analyzes whether or not tampering has occurred, and so on.

In S401, the CPU 201 of the server switching apparatus 107 (the switching unit 302) determines whether or not one of the server switching conditions has been met. This first server switching condition is, for example, that a predetermined period of time has elapsed. The CPU 201 determines that the predetermined period of time has elapsed using a timer or the like (the timer unit 305). When this switching condition is met, the process moves to S402.

In S402, the CPU 201 of the server switching apparatus 107 (the switching unit 302) determines whether or not one of the server switching conditions has been met. This second switching condition is that a virus has not been detected, or in other words, that an attack has not occurred, for example. Here, it is assumed that the main server 101 is active and the mirror server 104 is not active. In this case, the CPU 201 (the attack detection unit 301) executes a virus scanning program, and runs a virus scan on the mirror server 104 that is not connected to the WWW environment 100. Note that the CPU 201 (the attack detection unit 301) may run a tampering detection program, and then analyze whether or not the mirror server 104 that is not connected to the WWW environment 100 has been tampered with. When the second server switching condition is met, the process moves to S403.

In S403, the CPU 201 of the server switching apparatus 107 (the session information recording unit 306) overwrites the session information 106 in the mirror server 104 with the session information 103 in the main server 101.

In S404, the CPU 201 of the server switching apparatus 107 (the switching unit 302) disconnects the main server 101 from the WWW environment 100 and connects the mirror server 104 to the WWW environment 100. This connection/disconnection may be carried out by the transfer unit 303 employing a physical switch, or may be carried out through software, by the transfer unit 303 changing the transfer destination of a request.

The process moves to S411 in the case where a virus, tampering, or the like has been detected in S402. In S411, the CPU 201 of the server switching apparatus 107 (the user determination unit 309) determines the user that accessed the mirror server 104 during the active period by referring to the access log held in the access log holding unit 307.

In S412, the CPU 201 of the server switching apparatus 107 (the alert sending unit 310) sends, to the user that accessed the server during the active period, a message bringing the user's attention to an attack such as a virus infection, tampering, or the like. If the user's email address is registered in the access log, the alert sending unit 310 may send a message via email. Alternatively, the alert sending unit 310 may employ a messaging tool for sending messages to an IP address, and may send a message to the user's IP address.

In S413, the CPU 201 of the server switching apparatus 107 (the attacker specification unit 308) analyzes the access log based on the active period, narrows down the instances of server access where it is thought that the attack occurred, and identifies an infection route, a source of tampering, and so on. This identifies the IP address or the like of the computer that carried out the attack on the web server.

In S414, the CPU 201 of the server switching apparatus 107 carries out countermeasures against the attack. For example, the transfer unit 303 blocks further access by the user (the IP address or the like) considered to be the source of a virus infection, tampering, or the like. The CPU 201 of the server switching apparatus 107 may delete infected programs and scripts, correct areas that have been tampered with, and so on.

Incidentally, two or three of the server switching apparatus 107, the main server 101, and the mirror server 104 may be realized by the same information device, or may be constructed in a virtual environment, for example.

Figure 5:
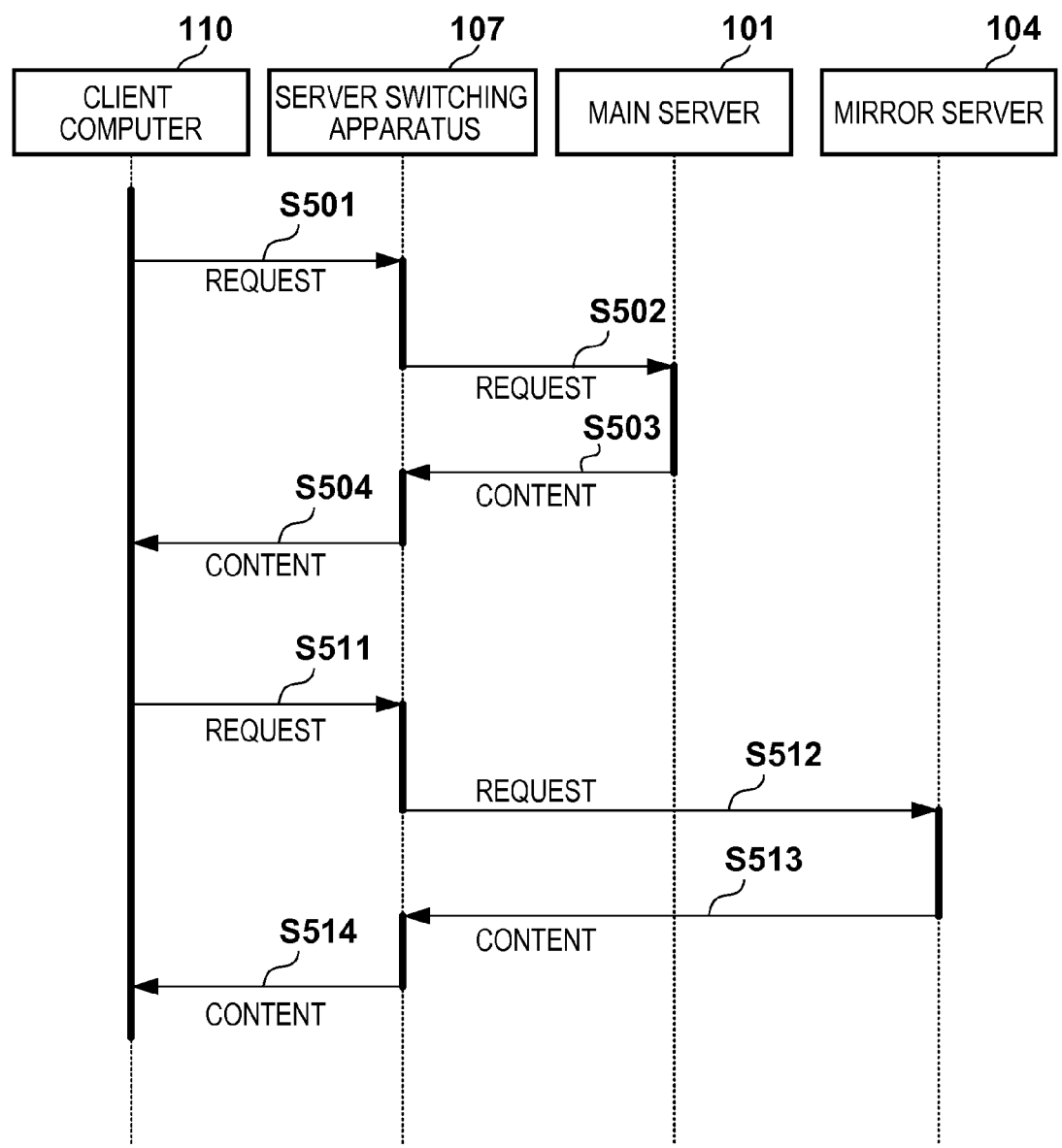
FIG. 5 is a sequence chart illustrating an example of the functional configuration of the system according to an embodiment.

FIG. 5 is a sequence chart illustrating an example of a communication process according to the present embodiment. When the client computer 110 sends a URL request (S501), the server switching apparatus 107 sends a request for server information (the web content 102) to the main server 101 (S502). Upon receiving the request, the main server 101 returns an HTML response (the web content 102) to the server switching apparatus 107 (S503). Having received the response, the server switching apparatus 107 transfers the HTML to the client computer 110 (S504).

When a predetermined amount of time has elapsed following the previous server switch, the server switching apparatus 107 switches the web server from the main server 101 to the mirror server 104.

When the client computer 110 sends a URL request (S511), the server switching apparatus 107 sends a request for server information (the web content 105) to the mirror server 104 (S512). Upon receiving the request, the mirror server 104 returns an HTML response (the web content 105) to the server switching apparatus 107 (S513). Having received the response, the server switching apparatus 107 transfers the HTML to the client computer 110 (S514).

When a predetermined amount of time has elapsed following the previous server switch, the server switching apparatus 107 switches the web server from the mirror server 104 to the main server 101.

Figure 6:
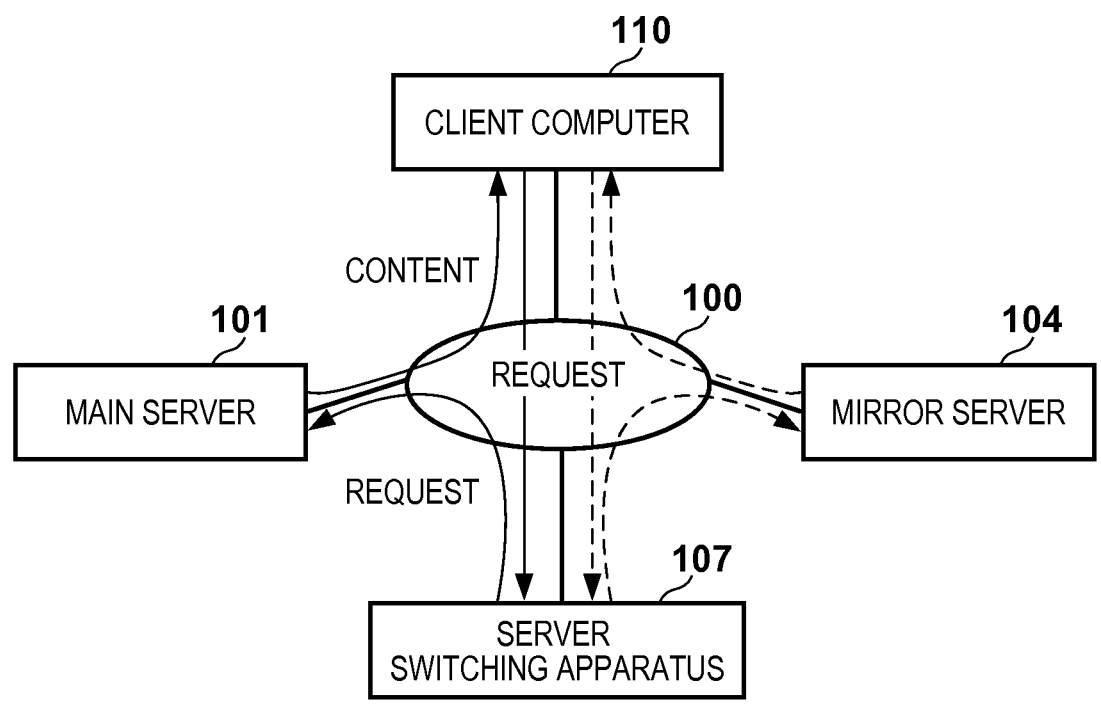
FIG. 6 is a block diagram illustrating an example of the functional configuration of the system according to an embodiment.

FIG. 6 is a diagram illustrating an example of another network connection state. In the connection state shown in FIG. 6, the main server 101 and the mirror server 104 are connected directly to the WWW environment 100. Upon receiving a URL request from a user, the server switching apparatus 107 sends the request to the main server 101. Having received the request, the main server 101 transfers the HTML to the client computer 110 through the WWW environment 100 directly, without passing through the server switching apparatus 107.

The server switching apparatus 107 then switches the web server after the predetermined amount of time has elapsed. Upon receiving the URL request from the client computer 110, the server switching apparatus 107 sends the request to the mirror server 104. Having received the request, the mirror server 104 transfers the HTML to the client computer 110 through the WWW environment 100 directly, without passing through the server switching apparatus 107. When the server switching apparatus 107 switches the active web server from the main server 101 to the mirror server 104, the session information in the mirror server 104 is overwritten with the session information 103 saved in the main server 101 through the WWW environment 100. Note that the overwrite may be executed through the server switching apparatus 107 at this time.

The aforementioned embodiment describes a configuration in which the session information is shared and synchronized by overwriting the session information when the server switching apparatus 107 switches the active web server. However, a configuration in which the session information is not overwritten when the server switching apparatus 107 switches the active web server in response to the predetermined amount of time elapsing may be employed as well. In such a case, users accessing the web server will be disconnected, but the server switching apparatus 107 or the web server that has become active may send a notification, such as "please reconnect" or the like, to the client computer 110. The user will then be able to access the desired web page once again by pressing a refresh button or the like.

According to the present embodiment, a user's operation information is kept by sharing session information, even in the case where the active web server has been switched. Furthermore, because the server switching apparatus 107 is traversed, the destination URL for the client computer 110 will be the same regardless of whether the web server is the main server 101 or the mirror server 104. Accordingly, even if the web server has been switched, it will appear to the user that he or she is operating/browsing the same web content.

According to the present embodiment, the web server connected to the WWW environment 100 can be switched, and thus the safety of web servers not connected to the WWW environment 100 can be ensured. The safety of the web content provided by the web servers can also be ensured. Meanwhile, in the case where some sort of virus, tampering, or the like has been detected, a message prompting the user to take notice of the infection, attack, or the like may be sent to the user that accesses the web content. This makes it easier to suppress secondary infections from spreading to other users from the user who was originally infected with the virus.

Other Embodiments

The aforementioned embodiment describes the main server 101 and the mirror server 104 as web servers. However, the main server 101 and the mirror server 104 may be information processing apparatuses aside from computers. For example, the main server 101 and the mirror server 104 may be provided in a multifunction peripheral (MFP), a printer, a network scanner, or the like.

Figure 7A:
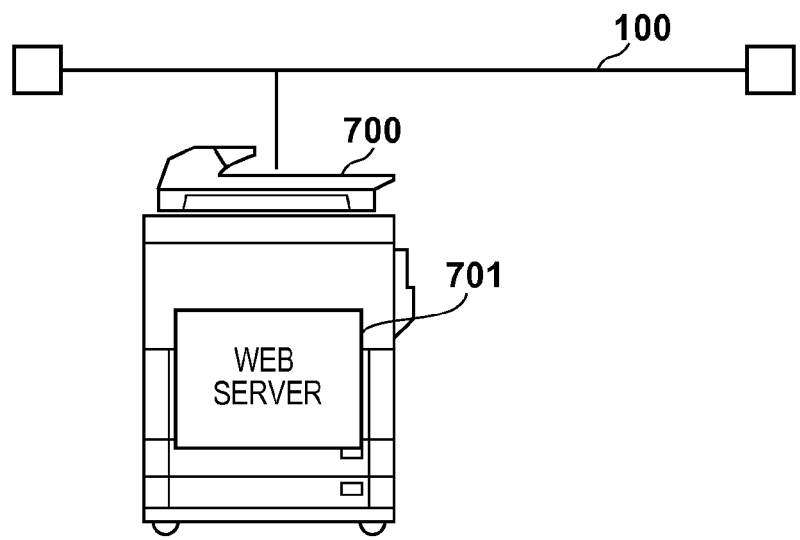
FIG. 7A is a block diagram illustrating an example of the functional configuration of a system according to another embodiment.
Figure 7B:
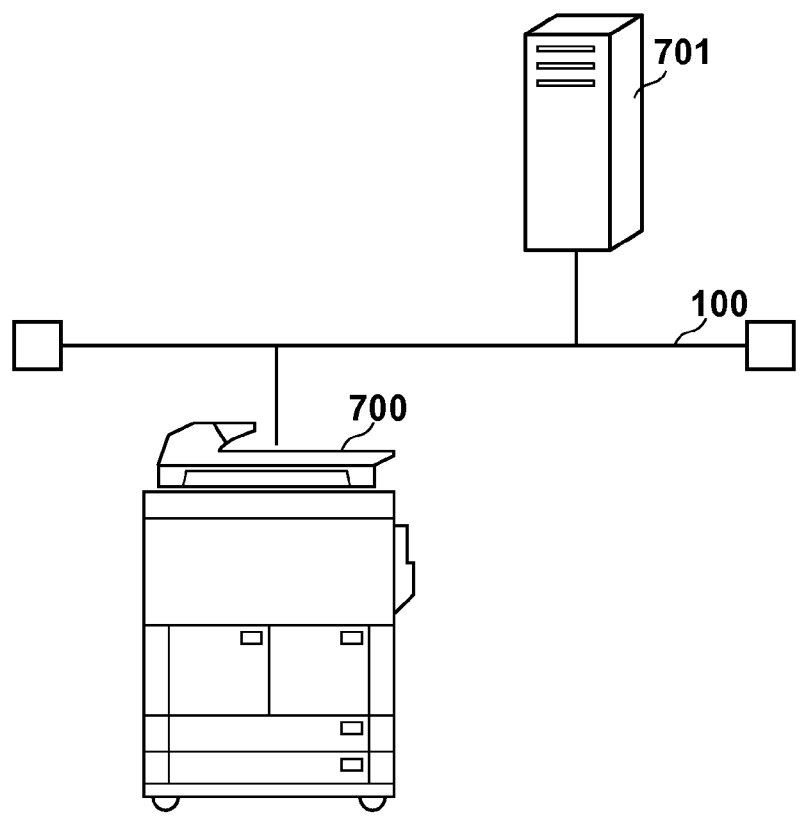
FIG. 7B is a block diagram illustrating an example of the functional configuration of the system according to another embodiment.

In recent years, many devices such as multifunction peripherals, scanners, and so on are connected to networks. This is so that a maintenance worker for such network devices can remotely confirm and inspect operational states, causes of problems, and so on in the network devices without having to directly operate the network devices in person. As such, a network device includes a communication unit and a remote access function. Specifically, as shown in FIG. 7A, a network device 700, which is an MFP or the like, includes a web server 701 used for maintenance. The maintenance worker carries out maintenance tasks by accessing the web server 701 from the client computer 110. Although the following descriptions assume that the web server 701 is provided within the network device 700, the web server 701 may be provided outside of the network device 700, as shown in FIG. 7B.

In addition, rather than being limited to maintenance tasks, a higher level of convenience can be realized by enabling a user of the network device to operate the network device remotely, without having to operate the network device in person. The network device 700, which is an MFP or the like, may include the web server 701 in order to realize such functionality as well.

Figure 12:
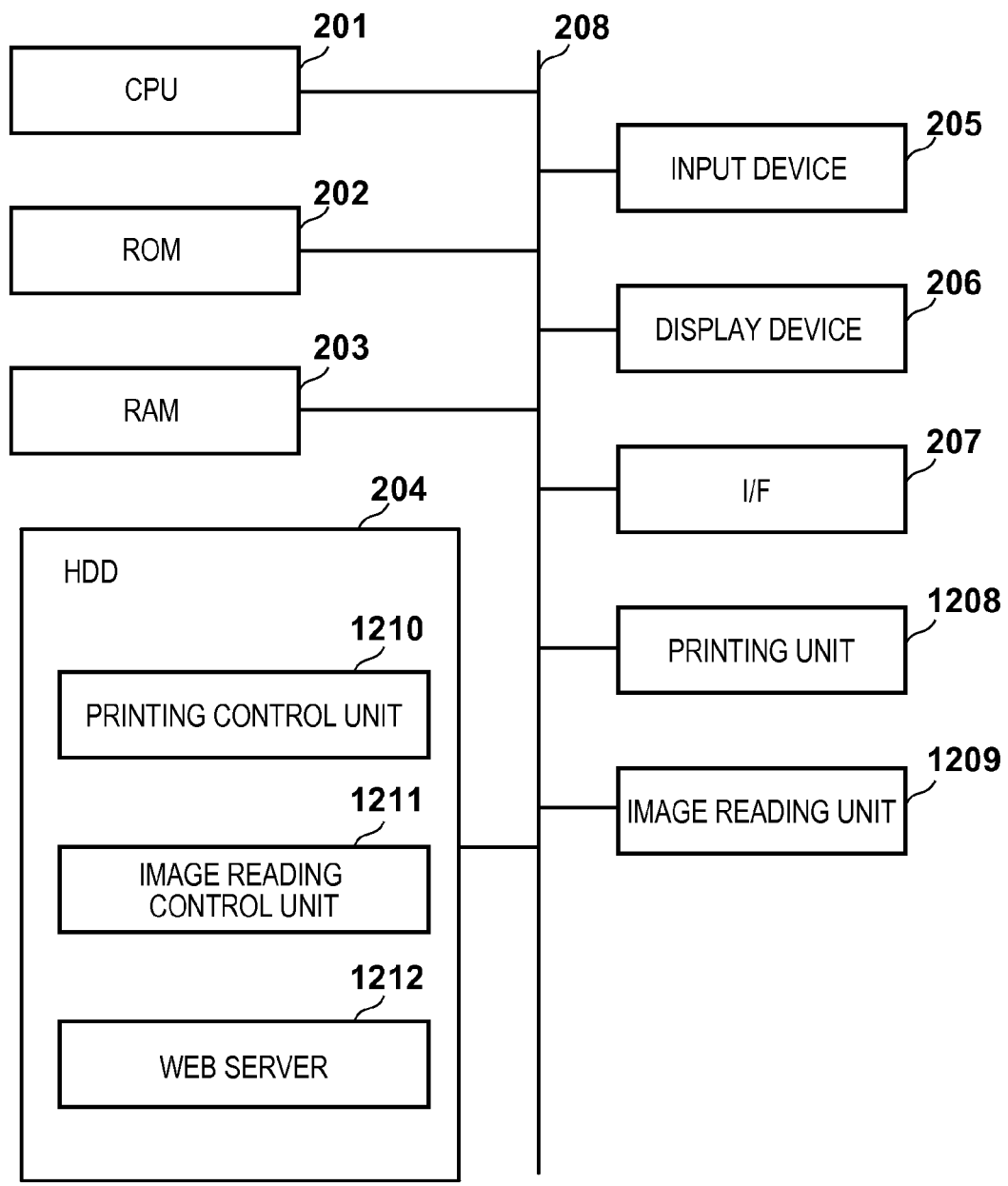
FIG. 12 is a block diagram illustrating an example of a hardware configuration according to another embodiment.

FIG. 12 is a block diagram illustrating an example of the hardware configuration of a computer that can be employed as the network device 700. The interface 207 is a network interface, for example. The interface 207 receives print data from a client computer connected to a network, and sends images that have been read to the client computer. A printing unit 1208 is configured of a laser printer, an ink jet printer, or the like. An image reading unit 1209 is an image scanner that scans a document placed upon a document glass of the network device 700. A printing control unit 1210, serving as a control program for the printing unit 1208, an image reading control unit 1211, serving as a control program for the image reading unit 1209, and a web server 1212, serving as a web server program, are stored in the HDD 204. The CPU 201 functions as a control unit, a server, and so on by executing these programs. Note that the display device 206 may be omitted.

For example, the maintenance worker runs an application such as an Internet browser on the client computer 110, and connects to the web server 701 of the network device 700. The maintenance worker then issues necessary commands from the browser running on the client computer 110, confirms a response from the web server 701 using the browser, and carries out appropriate actions through the browser. Like normal personal computers, the network device 700 can be a target for malicious attacks by attackers such as hackers. Actual cases where devices like the network device 700 are infected with computer viruses, content held in devices like the network device 700 is tampered with in an unauthorized manner, and so on are on the rise.

FIGS. 11A and 11B illustrate examples of content displayed in the display device 206 of the client computer 110 when the network device 700 is accessed from the client computer 110. This content is distributed to the client computer 110 from the web server 1212 of the network device 700.

Specifically, FIG. 11A illustrates a settings screen for sending an image read by the image reading unit 1209 of the network device 700 to the client computer 110 connected to a network. In FIG. 11A, "destination address" indicates a text box or a pull-down menu for specifying the email address of a partner (recipient) to which the read image is to be sent. "Color selection" indicates a settings button for selecting whether to read the document image in color or in black and white. "Resolution" indicates a pull-down menu for selecting a resolution at which to read the document. A resolution is selected from among a plurality of resolutions, such as 300 dpi×300 dpi, 600 dpi×600 dpi, or the like, for example. "Double-sided document" is a settings button for selecting whether to read both sides of the document or one side of the document.

Here, if the network device 700 is infected with a computer virus, the destination address can be replaced with the address of a client computer owned by a malicious attacker, in which case the read images will be sent to the attacker and used maliciously.

FIG. 11B illustrates a maintenance screen for the network device 700. For example, the maintenance screen displays the lifespan of a fuser and prompts a user, an administrator, or the like to replace the fuser, displays a remaining amount of toner and prompts the user, the administrator, or the like to refill the toner, and so on. Maintenance information such as that displayed in the maintenance screen is sent to the email address of a network device administrator registered in the network device 700, or to an email address assigned to a client computer. Here, if the network device 700 is infected with a computer virus, the destination address can be replaced with the address of a client computer owned by a malicious attacker, in which case the stated information will be sent to the attacker and used maliciously.

Figure 8A:
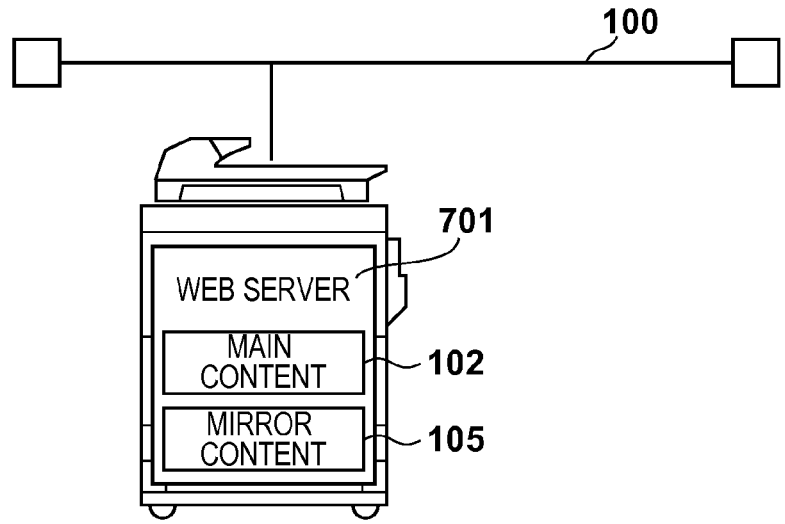
FIG. 8A is a block diagram illustrating an example of the functional configuration of the system according to another embodiment.

As shown in FIG. 8A, in the present embodiment, the network device 700, which is an OA device or the like and includes the web server 701, may hold main content 102 and mirror content 105. In other words, the web server 701 may have the functions of the aforementioned main server 101, mirror server 104, and server switching apparatus 107. Through this, the network device 700 can be prevented from being tampered with by attackers, and a safe environment in which to carry out maintenance tasks can be provided. Of course, the functions of the server switching apparatus 107 may be provided outside of the web server 701, the network device 700, and so on. For example, the server switching apparatus 107 may be connected directly to the network device 700, or may be connected via a network.

Figure 8B:
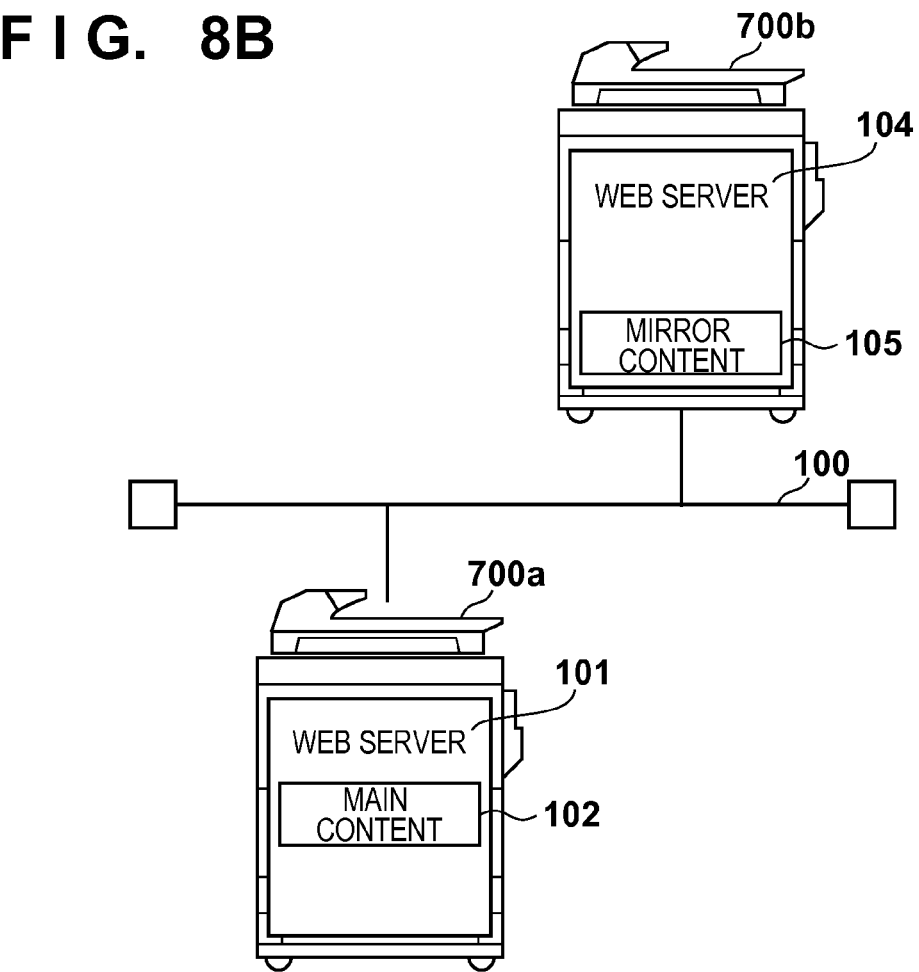
FIG. 8B is a block diagram illustrating an example of the functional configuration of the system according to another embodiment.

Note that as shown in FIG. 8B, the main server 101 that holds the main content 102 may be provided in a network device 700*a* and the mirror server 104 that holds the mirror content 105 may be provided in a network device 700*b*. The server switching apparatus 107 may be provided in one of the network devices 700*a* and 700*b*, or may be provided in a computer, network device, or the like that is independent therefrom.

Incidentally, the web content 102 and 105 may include a plurality of pieces of content. In other words, a content mirror may be implemented instead of a server mirror.

FIG. 9 illustrates a plurality of pieces of the same content held respectively in a plurality of servers.

The total amount of content made available on websites continues to increase. Even if a website has only a single landing page, there is often an expansive, multilayered link structure in that website. It is necessary to examine whether or not all pages within such websites have been tampered with, which can take an extensive amount of time. When such an examination task is carried out when switching between the main server 101 and the mirror server 104, the switch will take a longer amount of time. Longer switching times carry a heightened risk of tampering, viruses spreading, and so on.

Accordingly, when carrying out a process for synchronizing server content, the attack detection unit 301 does not examine all of the server content, but instead examines the content in set units. The copying unit 304 then copies the content examined by the attack detection unit 301 sequentially from the mirror server 104 to the main server 101, overwriting the content in the process (that is, rotating the content). This makes it possible to synchronize the server content efficiently. Furthermore, because it is not necessary for the attack detection unit 301 to execute the examination process when the switch occurs, the switching time can be shortened.

FIG. 10 is a flowchart illustrating an example of a content synchronization process. In S1001, the CPU 201 of the server switching apparatus 107 (the attack detection unit 301) reads out content to be examined from the mirror server 104 (content 1, for example). In S1002, the CPU 201 (the attack detection unit 301) examines the read-out content. For example, the attack detection unit 301 examines whether or not there is a virus, whether or not the content has been tampered with, or the like. In S1003, the CPU 201 (the attack detection unit 301) determines whether or not there is an abnormality in the content, such as a virus, evidence of tampering, or the like. The process moves to S1004 when there is no abnormality. In S1004, the CPU 201 (the copying unit 304) overwrites the content in the main server 101 (the content 1) with the content in the mirror server 104 (the content 1). The process then moves to S1007. In S1007, the CPU 201 (the attack detection unit 301) determines whether or not all of the content to be examined has been examined. If all of the content to be examined has been examined, the CPU 201 (the attack detection unit 301) ends the synchronization process according to this flowchart. On the other hand, if all of the content to be examined has not been examined, the process returns to S1001, where the CPU 201 (the attack detection unit 301) reads out the next content to be examined.

The process moves to S1005 when an abnormality is determined to be present in S1003. In S1005, the CPU 201 (the attack detection unit 301) sends a warning signal (for example, an email, web content, an instant message, or the like) to a user, an administrator, or the like. In S1006, the CPU 201 (the attack detection unit 301) executes a process for restoring the content to its proper state. For example, the CPU 201 (the attack detection unit 301) reads out and examines the content in the main server 101 (the content 1), and copies the content (the content 1) to the mirror server 104 if there is no abnormality. Alternatively, the CPU 201 (the attack detection unit 301) may delete infected programs and scripts, correct areas that have been tampered with, and so on. Further, the attacker specification unit 308 may specify the user (an IP address or the like) considered to be the source of a virus infection, tampering, or the like, and the transfer unit 303 may then be set to block further access from the user, as described above.

As described above, the access log holding unit 307 records an access history (an access log). The attack detection unit 301 may assign a priority level to the content to be examined (to be copied) based on that access history. For example, the attack detection unit 301 excludes content that has not been accessed by a user even once from copying, or sets a lower priority level for that content based on a frequency of access. Conversely, the attack detection unit 301 sets a higher priority level for frequently-accessed content, based on the frequency of access. In this manner, the attack detection unit 301 may schedule the examination of each piece of content in a prioritized manner, based on the priority level. As a result, content that is accessed by many users will be examined more frequently, which makes it possible to reduce high-risk periods in which users browse pages that have been tampered with.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-219493, filed Oct. 22, 2013, and Japanese Patent Application No. 2014-202107, filed Sep. 30, 2014, which are hereby incorporated by reference herein in their entirety.

What is claimed is:

1. A web system comprising:
a first web server configured to hold content;
a second web server configured to hold the same content as the content held in the first web server; and
a server switching apparatus configured to a web server providing the content to a user when a predetermined server switching condition is met,
wherein the server switching apparatus includes:
an attack detection unit configured to detect whether or not the web server, of the first web server and the second web server, that is not active in order to provide the content to the user, has not been attacked in the past;
a switching unit configured to switch from the web server that is active to the web server that is not active in the case where a condition that the web server that is not active has not been attacked in the past, serving as one server switching condition, is met; and
a transfer unit configured to, when a request is received from the user, transfer the request to the web server, of the first web server and the second web server, that has been activated by the switching unit,
wherein the first and second web servers are configured such that the web server, of the first web server and the second web server, that has been activated by the switching unit, sends content requested by the request to the user,
wherein the attack detection unit has a virus detection unit configured to detect a computer virus on the web server or a tampering detection unit configured to detect that the content has been tampered with, and
wherein the attack detection unit is further configured to detect whether or not the first web server has been attacked when the first web server is in an inactive state and the second web server is in an active state, and configured to detect whether or not the second web server has been attacked when the second web server is in the inactive state and the first web server is in the active state.

2. A web system comprising:
a first web server configured to hold content;
a second web server configured to hold the same content as the content held in the first web server; and
a server switching apparatus configured to a web server providing the content to a user when a predetermined server switching condition is met,
wherein the server switching apparatus includes:
an attack detection unit configured to detect whether or not the web server, of the first web server and the second web server, that is not active in order to provide the content to the user, has not been attacked in the past;
a switching unit configured to switch from the web server that is active to the web server that is not active in the case where a condition that the web server that is not active has not been attacked in the past, serving as one server switching condition, is met; and
a transfer unit configured to, when a request is received from the user, transfer the request to the web server, of the first web server and the second web server, that has been activated by the switching unit,
wherein the first and second web servers are configured such that the web server, of the first web server and the second web server, that has been activated by the switching unit, sends content requested by the request to the user, and
wherein the attack detection unit has a virus detection unit configured to detect a computer virus on the web server or a tampering detection unit configured to detect that the content has been tampered with,
the system further comprising:
a recording unit configured to record session information for the user,
wherein the same session information is shared between the first web server and the second web server by the recording unit, and the content is provided in accordance with the shared session information even in the case where the web server is switched,
wherein the first web server includes a first storage unit configured to store session information, wherein the second web server includes a second storage unit configured to store session information, and wherein the recording unit is further configured to copy the session information between the first storage unit and the second storage unit.

3. The web system according to claim 1, wherein the server switching apparatus further includes a timer unit configured to measure a set period of time, and wherein the switching unit is further configured to switch from the web server that is active in order to provide the content to the web server that is not active in the case where the set period of time has been measured by the timer unit and the attack detection unit has not detected an attack.

4. The web system according to claim 1, wherein the switching unit is further configured to switch from the web server that is active in order to provide the content to the web server that is not active in the case where a predetermined time has been reached and the attack detection unit has not detected an attack.

5. The web system according to claim 1, further comprising:

a holding unit configured to hold an access log for each user; and a specifying unit configured to, when the attack detection unit has detected an attack, specify a user that carried out the attack by referring to the access log, wherein the transfer unit is further configured to block further access by the user.

6. The web system according to claim 5, further comprising:

a determination unit configured to, based on the access log, determine a user that accessed a web server in which an attack has been detected by the attack detection unit when that web server was active; and an alert unit configured to send an alert to the user determined by the determination unit.

7. The web system according to claim 1, wherein the transfer unit is further configured to transfer the content provided by the web server that is active to the user.

8. The web system according to claim 1, wherein, when active, the first web server and the second web server send the content requested by the user directly to the user without passing through the server switching apparatus.

9. The web system according to claim 1, wherein the switching unit is further configured to switch the web server every predetermined period, and in the case where the attack detection unit detects that an attack has been carried out on the web server that is active, the web server is switched to the web server that is not active and has not been attacked even in the case where the predetermined period has not elapsed.

10. The web system according to claim 1, wherein at least one of the first web server and the second web server is a multifunction peripheral, a printer, or a network scanner.

11. The web system according to claim 1, wherein at least one of the first web server and the second web server is connected to a multifunction peripheral, a printer, or a network scanner.

12. A web system comprising:

a first web server configured to hold content;

a second web server configured to hold the same content as the content held in the first web server; and a server switching apparatus configured to a web server providing the content to a user when a predetermined server switching condition is met, wherein the server switching apparatus includes:

an attack detection unit configured to detect whether or not the web server, of the first web server and the second web server, that is not active in order to provide the content to the user, has not been attacked in the past;

a switching unit configured to switch from the web server that is active to the web server that is not active in the case where a condition that the web server that is not active has not been attacked in the past, serving as one server switching condition, is met; and a transfer unit configured to, when a request is received from the user, transfer the request to the web server, of the first web server and the second web server, that has been activated by the switching unit, wherein the first and second web servers are configured such that the web server, of the first web server and the second web server, that has been activated by the switching unit, sends content requested by the request to the user, and wherein the attack detection unit has a virus detection unit configured to detect a computer virus on the web server or a tampering detection unit configured to detect that the content has been tampered with, the system further comprising:

a copying unit configured to copy the content held in the first web server into the second web server, wherein the copying unit is further configured to ensure that the same content is held in the first web server and in the second web server, wherein the copying unit is further configured to examine whether or not there is an abnormality in content of the content held in the first web server that is to be copied, and copy the content to the second web server in the case where there is no abnormality, and wherein the copying unit is further configured to preferentially examine and copy content of the content held in the first web server that is accessed frequently.

13. A server switching apparatus, connected to a first web server configured to hold content and a second web server that holds the same content as the content held in the first web server, configured to switch a web server providing the content to a user when a predetermined server switching condition is met, the apparatus comprising:

an attack detection unit configured to detect whether or not the web server, of the first web server and the second web server, that is not active in order to provide the content to the user, has not been attacked in the past;

a switching unit configured to switch from the web server that is active in order to provide the content to the user to the web server that is not active in the case where a condition that the web server that is not active has not been attacked, serving as one server switching condition, is met; and a transfer unit configured to, when a request is received from the user, transfer the request to the web server, of the first web server and the second web server, that has been activated by the switching unit, wherein the attack detection unit has a virus detection unit configured to detect a computer virus on the web server or a tampering detection unit configured to detect that the content has been tampered with, and wherein the attack detection unit is further configured to detect whether or not the first web server has been attacked when the first web server is in an inactive state and the second web server is in an active state, and configured to detect whether or not the second web server has been attacked when the second web server is in the inactive state and the first web server is in the active state.

14. A program stored in a non-transitory computer-readable recording medium for causing a computer, the computer being connected to a first web server that holds content and a second web server that holds the same content as the content held in the first web server, to function as:

an attack detection unit configured to detect whether or not the web server, of the first web server and the second web server, that is not active in order to provide the content to the user, has not been attacked in the past;

a switching unit configured to switch from the web server that is active in order to provide the content to the user to the web server that is not active in the case where a condition that the web server that is not active has not been attacked, serving as one server switching condition, is met; and a transfer unit configured to, when a request is received from the user, transfer the request to the web server, of the first web server and the second web server, that has been activated by the switching unit, wherein the attack detection unit has a virus detection unit configured to detect a computer virus on the web server or a tampering detection unit configured to detect that the content has been tampered with, and wherein the attack detection unit is further configured to detect whether or not the first web server has been attacked when the first web server is in an inactive state and the second web server is in an active state, and configured to detect whether or not the second web server has been attacked when the second web server is in the inactive state and the first web server is in the active state.

15. A server switching method, for a server switching apparatus connected to a first web server that holds content and a second web server that holds the same content as the content held in the first web server, that switches a web server providing the content to a user when a predetermined server switching condition is met, the method comprising:

detecting whether or not the web server, of the first web server and the second web server, that is not active in order to provide the content to the user, has not been attacked in the past;

switching from the web server that is active in order to provide the content to the user to the web server that is not active in the case where a condition that the web server that is not active has not been attacked, serving as one server switching condition, is met;

in response to receiving a request from the user, transferring the request to the web server, of the first web server and the second web server, that has been activated in the switching; and the web server, of the first web server and the second web server, that has been activated in the switching, sending content requested by the request to the user, wherein the detecting includes detecting a computer virus on the web server or detecting that the content has been tampered with, and wherein the attack detection unit is further configured to detect whether or not the first web server has been attacked when the first web server is in an inactive state and the second web server is in an active state, and configured to detect whether or not the second web server has been attacked when the second web server is in the inactive state and the first web server is in the active state.

* * * * *